United States Patent Office.

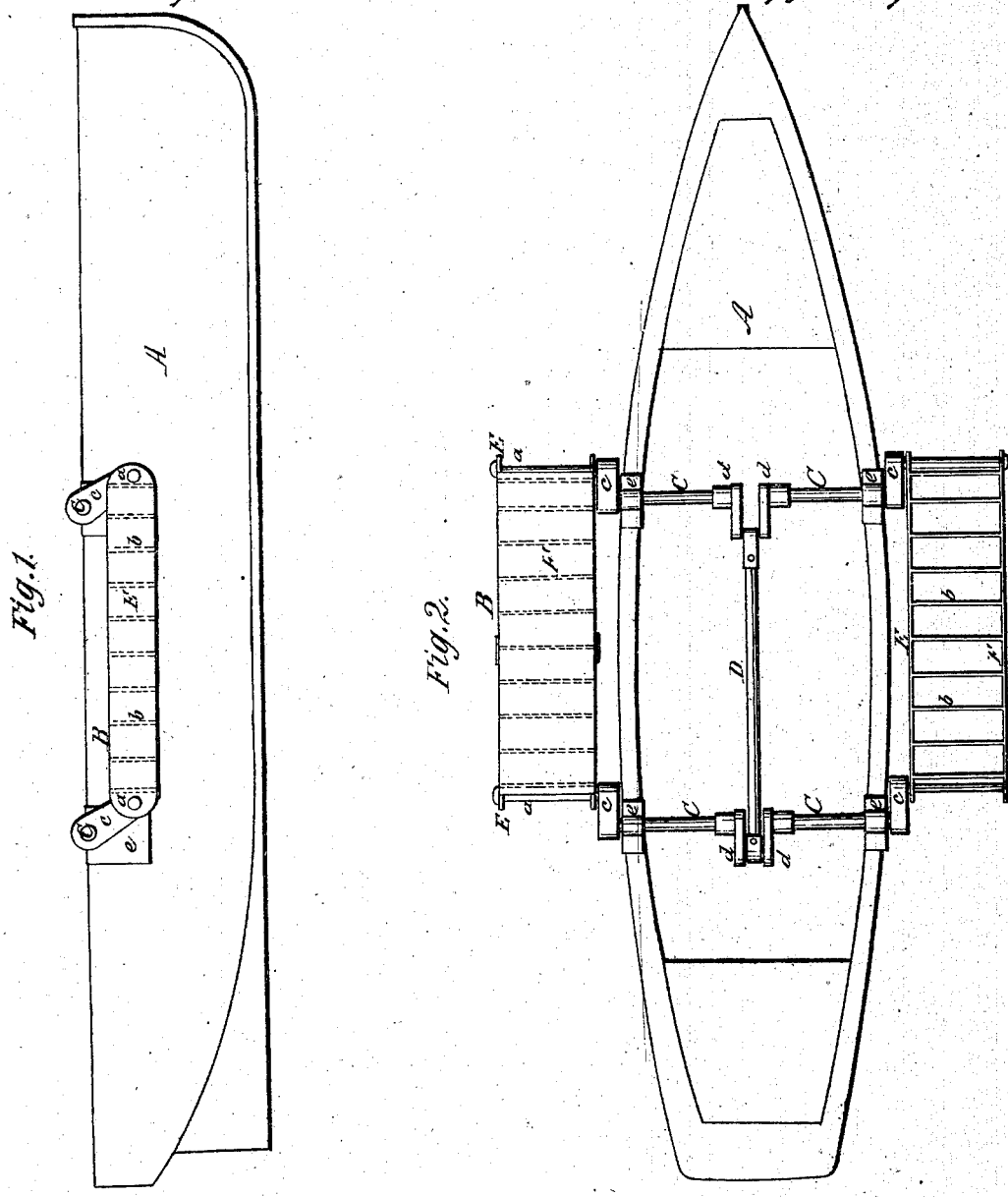

JACOB COVERT, OF NEW YORK, N. Y.

Letters Patent No. 62,255, dated February 19, 1867.

---

IMPROVED PROPELLER.

---

The Schedule referred to in these Letters Patent and making part of the same.

---

TO ALL WHOM IT MAY CONCERN:

Be it known that I, JACOB COVERT, of the city, county, and State of New York, have invented a new and improved Mode of Propelling Vessels; and I do hereby declare the following to be a full, clear, and exact description thereof, reference being had to the accompanying drawings, figures, and letters of reference thereon, making part of this specification. Of the said drawings—

Figure 1 is a side elevation.

Figure 2 is a top view.

Similar letters of reference indicate like parts in all the drawings.

My invention consists in the employment of a series of vertical floats or blades, secured to parallel bars by bolts and connected to cranks, so that as the cranks revolve the blades or floats are immersed in the water and the vessel propelled.

To enable others skilled in the art to make and use my invention, I will describe the construction and operation thereof.

A represents the hull of a vessel. B, the propellers having floats, $b\,b$. C C are shafts, secured in journal-boxes at $e\,e$, to one of which the motive power is to be connected by a crank or other suitable means. D is a rod, which connects the two shafts together by means of the arms $d\,d$ and a connecting-pin. To the ends of the shafts C are cranks, $c$, which connect, by a wrist-pin, $a$, with the parallel bars B, as plainly shown. To apply my invention to a vessel I first determine the lengths of the cranks $c$, for the dip of the floats or blades $b\,b$ in the water; I then locate the journal-boxes in the sides of the vessel to receive the shafts C C. The floats or blades $b\,b$ are secured to the parallel bars E by bolts or other fastenings, and the propeller may be covered by a cap, F, as shown in fig. 2, to prevent the spray from wetting the vessel.

The operation will be as follows: Motion being given to the crank-shafts C C, will, as the shafts revolve, raise from and dip the propeller into the water, and as the floats always retain their vertical position there is no lift of water, and the speed of a vessel will be greatly accelerated. When the propellers are capped small apertures may be left under the cover in the outside bar E for the air to pass out.

Having thus fully described my invention, what I claim, is—

A series of vertical floats or blades $b\,b$, secured to parallel sides E, and so arranged as to form a series of water compartments in combination with the crank C C, substantially as described and specified.

JACOB COVERT.

Witnesses:
THERESA ROTH,
ELIZABETH VAN HORN.